(12) United States Patent
Fu

(10) Patent No.: US 8,082,847 B1
(45) Date of Patent: Dec. 27, 2011

(54) CAVITY-ENHANCING FEATURES AND METHODS FOR A CAVITY-RUNNING PROJECTILE

(75) Inventor: Jyun-Horng Fu, Linden Creek Ct., VA (US)

(73) Assignee: Lockheed Martin Corporation, Bethesda, MD (US)

( * ) Notice: Subject to any disclaimer, the term of this patent is extended or adjusted under 35 U.S.C. 154(b) by 338 days.

(21) Appl. No.: 12/102,781

(22) Filed: Apr. 14, 2008

Related U.S. Application Data

(60) Provisional application No. 60/911,415, filed on Apr. 12, 2007.

(51) Int. Cl.
*F42B 15/22* (2006.01)
*F42B 19/46* (2006.01)

(52) U.S. Cl. .......... 102/399; 102/398; 114/20.1
(58) Field of Classification Search .......... 102/398, 102/399; 114/20.1
See application file for complete search history.

(56) References Cited

U.S. PATENT DOCUMENTS

| 1,371,207 | A | * | 3/1921 | Wilkinson | 102/398 |
| 5,929,370 | A | * | 7/1999 | Brown et al. | 102/399 |

* cited by examiner

*Primary Examiner* — Bret Hayes
(74) *Attorney, Agent, or Firm* — DeMont & Breyer, LLC

(57) ABSTRACT

A cavity-enhancing feature and method are disclosed for a projectile that is capable of operating underwater in a cavity-running mode.

20 Claims, 5 Drawing Sheets

CAVITY-ENHANCING FEATURES AND METHODS FOR A CAVITY-RUNNING PROJECTILE

STATEMENT OF RELATED CASES

This case claims priority of U.S. Provisional Patent Application Ser. No. 60/911,415, which was filed on Apr. 12, 2007 and is incorporated by reference herein.

FIELD OF THE INVENTION

The present invention relates to underwater moving bodies, such as projectiles, that are capable of operating in a cavity-running mode.

BACKGROUND OF THE INVENTION

Research and development is currently underway to produce underwater projectiles that travel at very high speeds using the phenomenon of "supercavitation." A progenitor of such projectiles is the "Shkval," which is a rocket-propelled torpedo that was developed by Russia and achieves a velocity of 250 knots (288 mph).

A supercavitating projectile's main features are a specially shaped nose and a streamlined, hydrodynamic, and aerodynamic body. The nose has a blunt leading surface that is referred to as a "cavitator." When the projectile travels through water at speeds in excess of about one hundred miles per hour, the cavitator deflects water outward so fast that the water flow separates and detaches from the surface of the projectile. Since water pressure takes time to collapse the wall of the resulting cavity, the nose opens an extended bubble of water vapor.

Given sufficient speed, the cavity can extend to envelop the entire projectile except the nose. One engulfed by the bubble, the drag experienced by the projectile is significantly reduced. As a consequence, a projectile moving in the cavity ("cavity-running") can travel at far greater speeds for a given amount of thrust than a projectile that is moving in a conventional manner through water. A cavity-running projectile quite literally "flies" through the surrounding gas. In the absence of sustaining propulsion, the projectile loses supercavitation and eventually stalls due to drag. A secondary benefit of cavity running is that the motion stability of the projectile is enhanced.

SUMMARY OF THE INVENTION

The present invention provides ways to enhance the supercavitation phenomenon to maintain or extend the time that an underwater moving body can sustain a cavity-running mode.

As mentioned in the Background section, a cavity-running mode is created as follows. The blunt nose of a rapidly-moving underwater body pushes aside water as the body advances. When the hydrodynamic pressure of water that is pushed aside overcomes the ambient static pressure, the water vaporizes. The vaporized water forms air bubbles, which coalesce to form a "cavity" in the water. If enough bubbles are formed, the cavity will be large enough to completely engulf the moving body (with the exception of the blunt tip of the nose). Since the moving body is then surrounded by air, rather than water, hydrodynamic drag is substantially reduced.

A situation can occur in which the cavity is not large enough to engulf the moving body; in these circumstances, at least a part of the body becomes "wet." This is a "partial cavitation" scenario. The transition from supercavitation to partial cavitation can be quite violent and abrupt, possibly resulting in damage to the moving body.

It is therefore advantageous to provide, to a body that is capable of operating in a cavity-running mode, one or more cavity-enhancing features that maintain or increase cavity size when the prevailing conditions would otherwise cause a loss in the size of the cavity.

The cavity-enhancing features disclosed herein comprise surface features, mechanisms, electronics, etc., that promote the generation of gas bubbles, the work of which resembles pumping more (or less under active control) air into the cavity that shrouds the moving body.

Since the embodiments disclosed herein use fluid (i.e., water) that is external to the moving body, the various cavity-enhancing features incur minimum space and weight penalties. Furthermore, it is notable that current cavity-running bodies require an initial velocity in excess of the minimum required for supercavitation. But a cavity-running body that possesses one or more of the cavity-enhancing features that are described herein does not. The reason for this is that the various features disclosed herein generate gas bubbles. As a consequence, a moving body that does not otherwise possess a sufficiently high initial velocity (to generate enough gas bubbles to engulf itself) can enter a cavity-running mode by "artificially" generating more gas bubbles and, hence, a larger cavity.

In some embodiments, the cavity-enhancing feature is passive. A passive adaptation is typically a static attribute of the body, such as the roughness of a cavity-generating surface. In some other embodiments, the cavity-enhancing feature is active. An active feature is something that is typically controllable (e.g., a morphable surface feature, a propeller, releasing energy to the environment, etc.) in response to a sensed condition.

In some additional embodiments, a cavity-running body includes more than one cavity-enhancing feature. In these additional embodiments, the cavity-enhancing features can be all passive, all active, or a combination of passive and active.

When using an active cavity-enhancing feature, some "intelligence" is used to determine when to actuate the enhancement feature(s). In some embodiments, the intelligence is acquired from one or more sensors. The sensors must be able to sense a parameter that is indicative of a need to change the size of the cavity. And the change can be either to increase the size of the cavity or reduce it.

DETAILED DESCRIPTION

The terms and phrases listed below are defined for use in this description and the appended claims as follows:

"Cavity-running mode" is a mode in which a submerged projectile that is surrounded by an air cavity moves through water.

"Cavitation enhancing" or "Cavity enhancement" means to increase the size of the cavity or maintain cavity size when the prevailing conditions would otherwise cause a loss in cavity size.

"Projectile" means any artificial body, either powered, such as by a motor, or un-powered, such as a bullet, etc.

"Substantially right-circular cylindrical section" means a section having a substantially uniform cylindrical cross-section whose front face (i.e., the exposed surface of the cylinder that faces a target) is within approximately ±10 degrees of orthogonality with respect to the section's longitudinal axis.

"Substantially right-circular conic section" means a conic section whose front face is within approximately ±10 degrees of orthogonality with respect to the longitudinal axis of the section.

Figure 1:
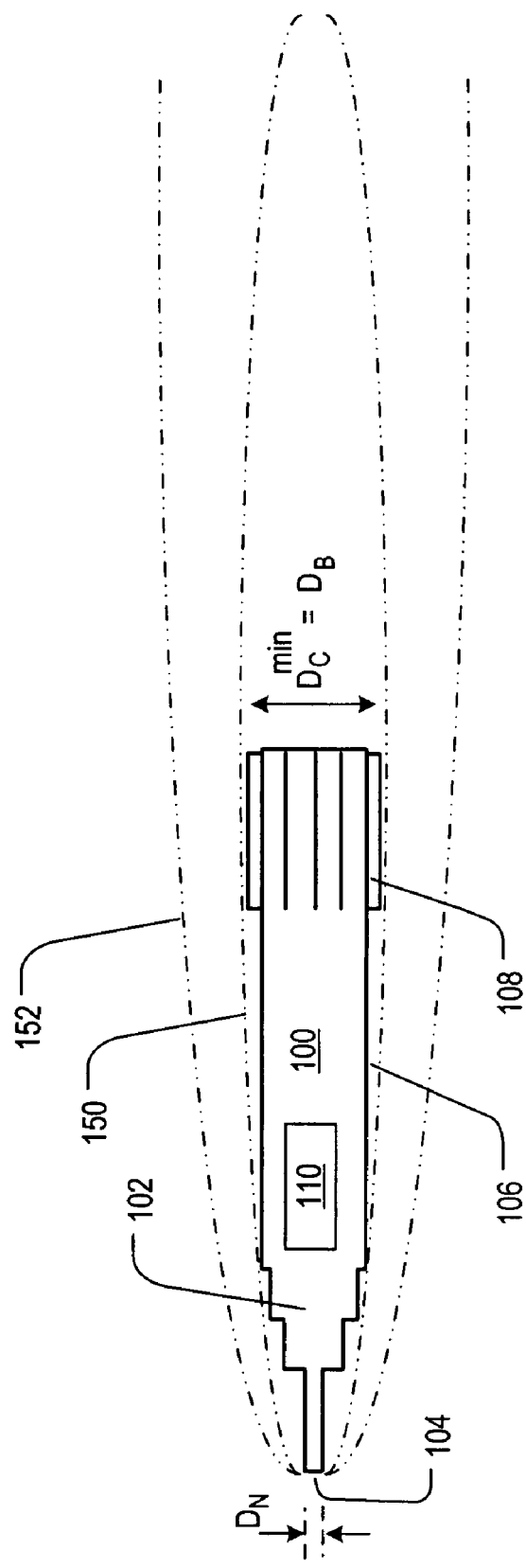
FIG. 1 depicts a projectile that is suitable for creating the supercavitation phenomena and of operating in a cavity-running mode. The projectile is depicted in the cavity running mode.

FIG. 1 depicts projectile 100 having nose 102, body 106, fins 108, and cavity-enhancement feature 110 in accordance with the illustrative embodiment of the present invention. Projectile 100 is suitable for developing supercavitation and operating in a cavity-running mode.

Tip 104 of nose 102 is the surface against which water impacts projectile 100 moves under water. This water-impacting surface is relatively flat or blunt and is, in fact, responsible for creating the cavitation phenomena and generating vapor cavity 150. For that reason, tip 104 is hereinafter referred to as "cavitator 104." Vapor cavity 150 is an illustration of a minimal-size cavity for enveloping projectile 100, wherein all features of the projectile remain just within cavity 150.

In the depicted embodiment, nose 102 of projectile 100 comprises several substantially right-circular cylindrical sections. These sections exhibit a gradual increase in diameter to define a geometry that remains completely within the bounds of cavity 150. Fins 108, which are longer in chord and shorter in span than typical fins, are disposed near the tail of projectile 100. In some other embodiments (not depicted), the nose of the projectile comprises a plurality of substantially right-circular conic sections. See, U.S. patent application Ser. No. 12/057,123, which is incorporated by reference herein.

By virtue of cavity-enhancing feature 110, projectile 100 is capable of creating enlarged an vapor cavity, such as cavity 152. For purposes of illustration but not limitation, cavity 152 defines an ellipsoidal shape that has a major axis and a minor axis that is about twice as large as the major and minor axes of cavity 150. (Only about one-half of cavity 152 is depicted due to space limitations.) As described further below, cavity-enhancing feature 110 need not be located in/on body 106 of projectile 100. For example, the cavity-enhancing feature can be located in/on tip 104 of nose 102 or in other locations, as appropriate.

The cavity diameter $D_c$ is expressed as a function of supercavitating velocity $v_{sc}$ and projectile nose diameter $D_N$ from the following empirically determined expression:

$$D_c = (0.2133875 + 0.9100519 v_{sc}) \times D_N \quad [1]$$

It is evident that cavity-running mode operation is lost when the diameter $D_B$ of the projectile is equal to the diameter of the vapor cavity. Therefore, expression [1] can be written as:

$$D_B = (0.2133875 + 0.9100519 v_{sc}) \times D_N \quad [2]$$

Supercavitating velocity $v_{sc}$ can then be expressed in terms of the ratio of the diameter of the projectile's body to the projectile's nose:

$$V_{sc} = (1.0989[D_B/D_N] - 0.2345) \times V_c \quad [3]$$

Where: $V_c$ is given by $V_c = (2P/\rho_{water})^{1/2}$;
$\rho_{water}$ is the density of the water at the relevant temperature;
P is the static drag.

As a consequence, given the relevant diameters of the projectile, the minimum size of the cavity is known and supercavitating velocity $V_{sc}$ can be determined. Or, given a requirement for supercavitating velocity (or range), then the projectile nose and body diameters (and minimum cavity size) can be determined. In expressions [1]-[3] above, nose diameter $D_N$ refers to the diameter of the cavitator (i.e., tip 104), rather than an averaged diameter that considers all sections of nose 102.

Figure 2:
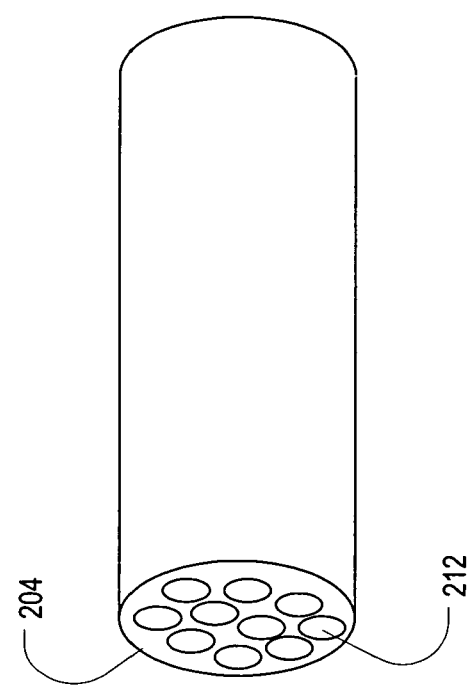
FIG. 2 depicts a first embodiment of a cavity-enhancement feature, wherein the feature is a roughened surface of the nose cavitator.

FIG. 2 depicts a first embodiment of cavity-enhancing feature 110. The cavity-enhancing feature depicted in FIG. 2 is a modification of the surface of cavitator 204. The surface is treated in such a way as to increase the friction that is generated as water impacts the cavitator. In some implementations of the first embodiment, the treatment is to roughen the surface of the cavitator. This is done, for example and without limitation, by randomly positioned dimples, protrusions, or the like over the surface of the cavitator. In some implementations, the dimples and/or protrusions can be regularly patterned, like the dimples on the surface of a golf ball.

As a consequence of increased friction, the laminar flow is shed off of the surface of the nose, such that turbulence and bubbles emerge.

Figure 3:
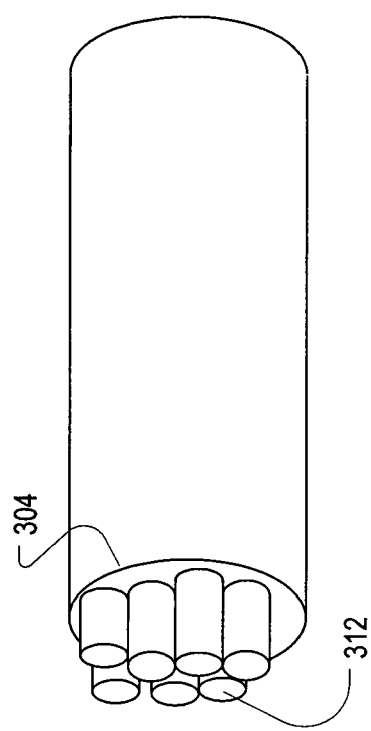
FIG. 3 depicts a second embodiment of a cavity-enhancement feature, wherein the feature is an actively morphable surface contour of the nose cavitator.

FIG. 3 depicts a second embodiment of cavity-enhancing feature 110. The cavity-enhancing feature depicted in FIG. 3 is a modified cavitator 304, which incorporates a contour-forming element(s). The contouring-forming element(s), which is embedded in the cavitator, is capable of forming contours (e.g., crests and valleys, etc.) in a controlled manner.

In the illustrative embodiment that is depicted in FIG. 3, the contour-forming elements are a plurality of individually-controllable rods 312. When actuated, the rods are capable of protruding from cavitator 304 by a desired distance, which can vary for each rod.

The embodiment that is depicted in FIG. 3 is essentially an "active" version of the embodiment that is depicted in FIG. 2. In other words, the surface profile of cavitator 304 can be changed while projectile 100 is underway, based on some "intelligence."

Figure 4:
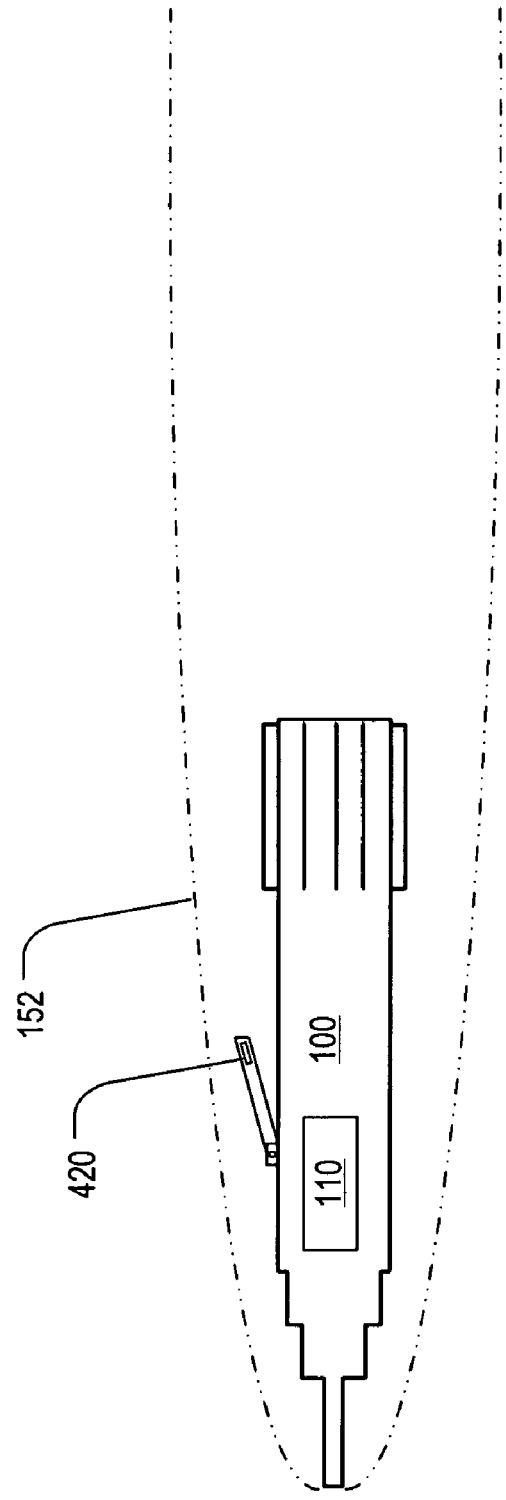
FIG. 4 depicts a sensor for use in controlling the operation of the active cavity-enhancement features disclosed herein.

In fact, all of the "active" cavity-enhancing features described herein rely on some intelligence for determining when to actuate the cavity-enhancing feature. In some embodiments, the intelligence is acquired from one or more sensors 420, as depicted in FIG. 4. The sensors must be able to sense a parameter that is indicative of need to change the size of cavity 152—either enhance it or reduce it.

In some embodiments, sensor 420 is "wetness" sensor, which is implemented as an electrical conductivity sensor. The sensor exploits the difference in electrical conductivity between gas and water. In some embodiments, the sensor is deployed such that when the moving body is in a cavity-running mode, the sensor will be within the cavity. When the cavity shrinks to some threshold size, the sensor will be exposed to increased levels of moisture or liquid water. When a set point (a specific moisture level or the presence of water is detected) is reached, the sensor can generate a signal that actuates the cavity-enhancement device.

In some embodiments, the sensor directly triggers the cavity-enhancing feature, generating a predetermined response (e.g., adjustment) in the cavity-enhancing feature. Although this arrangement defines a rudimentary feedback system, some embodiments will include more sophisticated control arrangements that employ advanced feedback/feed-forward control techniques, as is known to those skilled in the art. Depending upon the manner in which such systems are operated, the active cavity-enhancement feature will be in a state of substantially constant adjustment to control the cavity size. For example, the system might control to some specified gap between the outermost edge of projectile 100 and the boundary of the cavity, etc.

In some other embodiments, the sensor signal is sent to a microprocessor that ultimately controls the cavity-enhancement device. In some embodiments, based on a measurement of velocity and having the relevant dimensions of the projectile stored in a processor-accessible memory, the microprocessor can calculate the minimum size cavity for the projectile. Based on the calculated minimum cavity size and performance data for the particular on-board cavity-enhancement feature, the feature is appropriately actuated to adjust the cavity to a desired size, etc. Of course, feedback control is advantageously used in conjunctions with such embodiments.

In yet some further embodiments, the active cavity-forming element, such as the contour-forming element(s) of FIG. 3, are trained in advance to form a contour that is appropriate for the prevailing conditions. Either a look-up table can be used for this purpose, or, alternatively, the cavity-forming element can be designed to react (e.g., mechanically, etc.) to the prevailing conditions.

In light of the present disclosure, those skilled in the art will be able to incorporate any of a variety of different types of sensors and/or control arrangements for embodiments of the present invention that employ an active cavity-enhancing feature.

Figure 5:
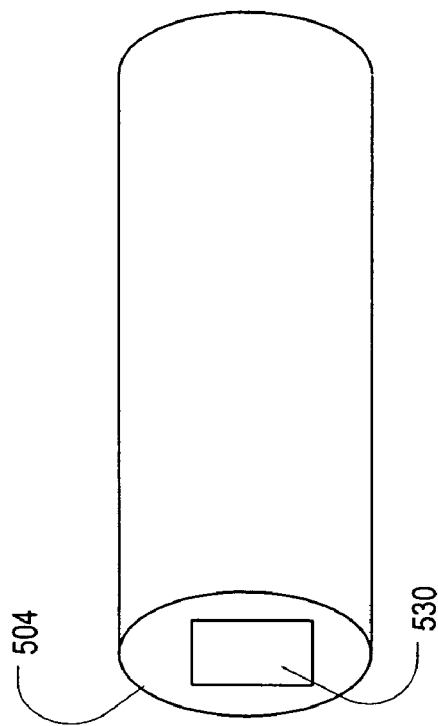
FIG. 5 depicts a third embodiment of a cavity-enhancement feature, wherein the feature is a piezoelectric quartz fork tuner that is embedded in the nose cavitator.

FIG. 5 depicts a third embodiment of cavity-enhancing feature 110. The cavity-enhancing feature depicted in FIG. 5, which is active, is piezoelectric quartz fork tuner 530, which is embedded in cavitator 504. The tuner oscillates at ultrasound/microwave frequencies resonating with water molecules, thereby heating and ultimately vaporizing the water. See, e.g., U.S. Pat. No. 5,434,547.

Figure 6:
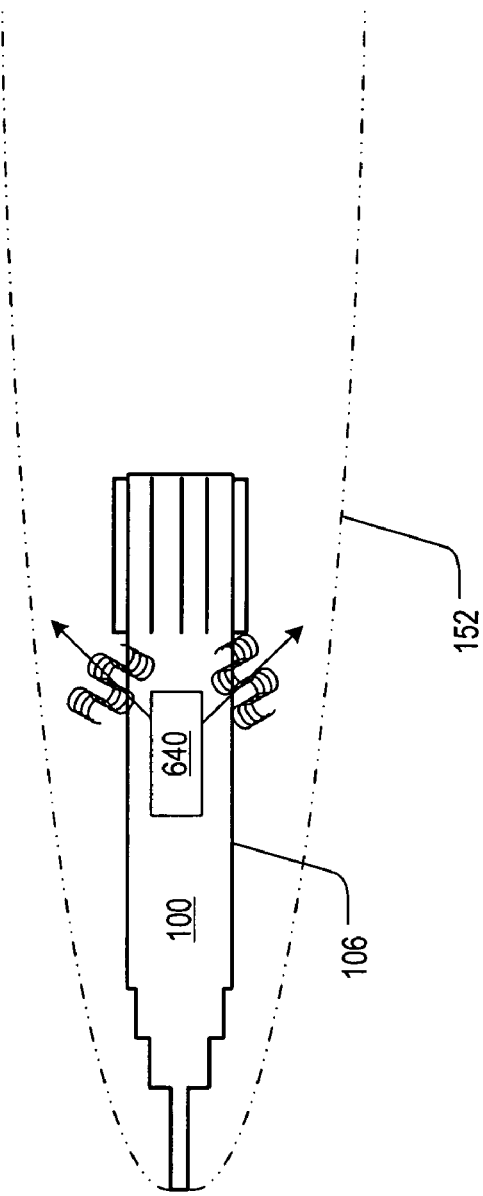
FIG. 6 depicts a fourth embodiment of a cavity-enhancement feature, wherein the feature is a microwave generator that is embedded in the projectile.

FIG. 6 depicts a fourth embodiment of cavity-enhancing feature 110. The cavity-enhancing feature depicted in FIG. 6, which is active, is microwave generator 640. The microwave generator, which in some embodiments includes a crystal and antennae, is used to heat-up the air within the cavity, thereby increasing its vapor pressure (to decrease cavitation number). Microwave generator 640 is disposed in body 106 of projectile 100. Sustained microwave power is used to balance and equilibrate temperature and vapor pressure within the cavity to maintain the cavity's integrity.

Figure 7:
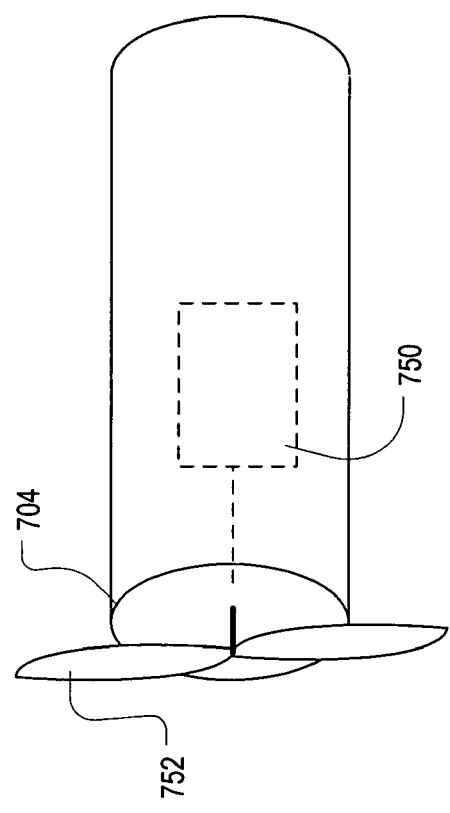
FIG. 7 depicts a fifth embodiment of a cavity-enhancement feature, wherein the feature is a high-speed micro-motor and propeller for generating bubbles.

FIG. 7 depicts a fifth embodiment of cavity-enhancing feature 110. The cavity-enhancing feature depicted in FIG. 7, which is active, is high-speed motor 750 that is coupled to propeller 752. The motor is embedded in the nose of projectile 100 near the cavitator 704. Motor 750 is positioned in front of cavitator 704. The motor drives propeller 752, which generate bubbles.

If projectile 100 is deck launched, propeller 752 deploys underwater, so that it is not destroyed on water entry. In some embodiments, motor 750 is implemented as a MEMS device, etc.

Figure 8:
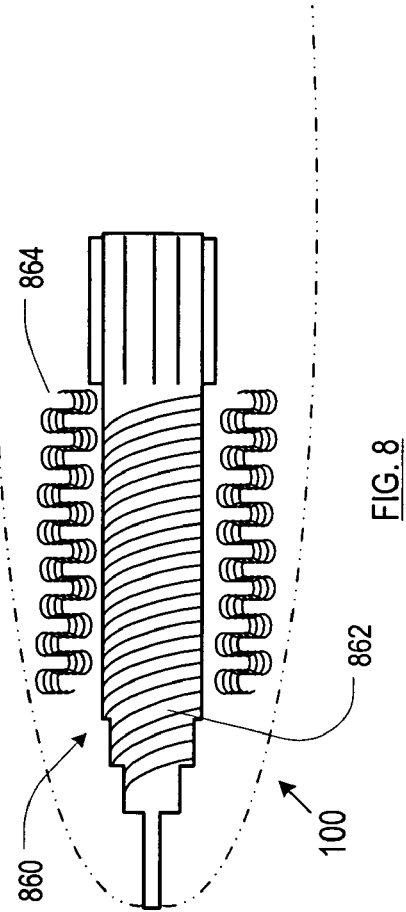
FIG. 8 depicts a sixth embodiment of a cavity-enhancement feature, wherein the feature is a radiator that dissipates heat to the cavity from internal heat sources of the projectile.

FIG. 8 depicts a sixth embodiment of cavity-enhancing feature 110. The cavity-enhancing feature depicted in FIG. 8, which can be active or passive, is heat-collection system 860. Most heat that is generated by heat sources in projectile 100 (e.g., artificial ventilation subsystem, rocket motor, etc.) is collected and transferred to the surface of projectile 100 via pipes or channels. Heat 864 reaching the surface of the projectile is dissipated to the cavity, thereby increasing the vapor pressure of the gas in the cavity and decreasing cavitation number. This enlarges cavity size and decreases drag coefficient.

In some implementations of the sixth embodiment, grooved radiator 862 is disposed on the surface of projectile 100, wherein the pitch angles of the grooves conform to the cavity's generally ellipsoid dimensions.

In some implementations of the sixth embodiment, heat is artificially generated via projectile 100 to accelerate the increase in vapor pressure within the cavity.

It is notable that the active control of active cavity-enhancing features can be used to control (i.e., navigate) projectile 100.

It is to be understood that many variations of the invention can easily be devised by those skilled in the art after reading this disclosure and that the scope of the present invention is to be determined by the following claims.

What is claimed is:

1. A projectile that is capable of moving underwater and that is structurally adapted to establish and sustain a cavity-running mode, wherein the projectile comprises:
 a body having a first diameter;
 a cavitator coupled to the body, wherein the cavitator has a second diameter, and wherein the body and cavitator are suitably dimensioned and arranged, including a suitable ratio of the first diameter to the second diameter, to generate an air cavity underwater, thereby establishing the cavity-running mode, and further wherein the air cavity has a third diameter that is greater than the first diameter; and
 first cavity-enhancing feature for increasing the size of the air cavity or maintaining the size of the cavity when prevailing ambient conditions would otherwise cause a decrease in the size of the cavity, wherein the first cavity-enhancing feature comprises a modification to the cavitator that increases the friction that is generated upon impact of the cavitator with water relative to the friction that is generated by the cavitator in an unmodified state.

2. The projectile of claim 1 wherein the modification increases a surface roughness of the cavitator relative to the surface roughness of the cavitator in an unmodified state.

3. The projectile of claim 2 wherein the modification comprises a plurality of dimples.

4. The projectile of claim 2 wherein the modification comprises a plurality of protrusions.

5. The projectile of claim 2 wherein the cavity-enhancing feature comprises a contour-forming feature, wherein the contour-forming feature forms contours on a water-impacting surface of the cavitator.

6. The projectile of claim 1 further comprising a second cavity-enhancing feature.

7. The projectile of claim 6 wherein the second cavity-enhancing feature is actuated in response to a sensed condition.

8. The projectile of claim 7 wherein the sensor is electrically coupled to at least one of the first cavity-enhancing feature and the second cavity-enhancing feature, wherein the sensor generates a signal that actuates the cavity-enhancing feature.

9. The projectile of claim 6 wherein the second cavity-enhancing feature comprises a piezoelectric tuner, wherein the piezoelectric tuner is embedded in the cavitator, and wherein the tuner oscillates at frequencies near to the natural frequency of sea water molecules.

10. The projectile of claim 6 wherein the second cavity-enhancing feature comprises a microwave generator, wherein the microwave generator is disposed in the projectile, and wherein the microwave generator heats-up air in the cavity that is created by the cavitator.

11. The projectile of claim 6 wherein the second cavity-enhancing feature comprises:
 a high-speed motor, wherein the high-speed motor is embedded in the cavitator; and
 a propeller, wherein the propeller is coupled to the motor and is disposed forward of the water-impacting surface.

12. The projectile of claim 6 wherein the second cavity-enhancing feature comprises:
 a high-speed motor, wherein the high-speed motor is embedded in the cavitator; and
 a propeller, wherein the propeller is coupled to the motor and is deployable from within the cavitator, and wherein, when deployed, the propeller is disposed forward of the water-impacting surface.

13. The projectile of claim 6 wherein the second cavity-enhancing feature comprises a radiator for collecting heat that is generated in the projectile and transferring it to the surface of the projectile.

14. The projectile of claim 13 wherein the radiator further comprises a groove that is disposed in a surface of the projectile.

15. The projectile of claim 13 further comprising a heater to generate more heat to be radiated by the radiator.

16. The projectile of claim 6, wherein at least one of the first cavity-enhancing feature and the second cavity-enhancing feature is passive and at least one of the first cavity-enhancing feature and the second cavity-enhancing feature is active.

17. The projectile of claim 1 further comprising a sensor, wherein the sensor senses a characteristic that is indicative of a need to change the size of the air cavity generated by the cavitator.

18. The projectile of claim 17 wherein the sensor senses a characteristic that is indicative of a change in moisture level.

19. The projectile of claim 17 wherein the sensor senses the presence or absence of water.

20. The projectile of claim 17 wherein the sensor is electrically coupled to the first cavity-enhancing feature and wherein the sensor generates a signal that actuates the first cavity-enhancing feature.

* * * * *